(12) United States Patent
Sedlmaier et al.

(10) Patent No.: US 10,646,063 B2
(45) Date of Patent: May 12, 2020

(54) HORIZONTAL JUICE EXTRACTOR

(71) Applicant: KONINKLIJKE PHILIPS N.V., Eindhoven (NL)

(72) Inventors: Peter Sedlmaier, Eindhoven (NL); Mart Kornelis-Jan Te Velde, Eindhoven (NL); Stefan Toonen, Eindhoven (NL); Christian Mikula, Eindhoven (NL); Juergen Holzbauer, Eindhoven (NL); Kien-Vu Do, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 429 days.

(21) Appl. No.: 15/518,334

(22) PCT Filed: Sep. 30, 2015

(86) PCT No.: PCT/EP2015/072503
§ 371 (c)(1),
(2) Date: Apr. 11, 2017

(87) PCT Pub. No.: WO2016/058829
PCT Pub. Date: Apr. 21, 2016

(65) Prior Publication Data
US 2017/0303723 A1     Oct. 26, 2017

(30) Foreign Application Priority Data

Oct. 15, 2014   (EP) ..................................... 14189084

(51) Int. Cl.
*A47J 19/02* (2006.01)
*A23N 1/02* (2006.01)
*B30B 9/14* (2006.01)

(52) U.S. Cl.
CPC ................. *A47J 19/02* (2013.01); *A23N 1/02* (2013.01); *A47J 19/025* (2013.01); *B30B 9/14* (2013.01)

(58) Field of Classification Search
CPC .......... A47J 19/02; A47J 19/025; A47J 19/00; A47J 19/06; A23N 1/02
(Continued)

(56) References Cited

U.S. PATENT DOCUMENTS

| 4,273,035 A | 6/1981 | Cusi |
| 5,452,650 A | 9/1995 | Lee |

(Continued)

FOREIGN PATENT DOCUMENTS

| GB | 1000773 A |   | 3/1963 |   |
| GB | 1506455 A | * | 4/1978 | ............... B30B 9/12 |
| GB | 1506455 A |   | 4/1978 |   |

*Primary Examiner* — Phuong T Nguyen

(57) ABSTRACT

Disclosed is a horizontal juice extractor (100) comprising a main body delimiting a food processing chamber (110) comprising a juice outlet (140), a food entry section (112) having a food inlet (130) and a food compression section (114) extending from the food entry section and having a food pulp outlet (150); a spindle (120) extending through the food processing chamber for transporting food from the food entry section through the food compression section, said spindle comprising a body (122) and a helical member (123) extending from said body; and a drivetrain (160) adapted to rotate the spindle, wherein the food compression section (114) is located in between the food entry section (112) and said drivetrain (160). The food entry section (112) comprises said juice outlet (140) at or near a distal end of said main body relative to the drivetrain, wherein the juice outlet (140) is vertically displaced relative to the food inlet (130).

18 Claims, 13 Drawing Sheets

(58) Field of Classification Search
USPC .......... 99/501, 348, 492, 495, 503, 504, 99/509–513
See application file for complete search history.

(56) References Cited

U.S. PATENT DOCUMENTS

| | | | |
|---|---|---|---|
| 5,592,873 A | 1/1997 | Lee | |
| 6,425,321 B1 * | 7/2002 | Yip | A47J 19/025 99/495 |
| 6,637,323 B2 | 10/2003 | Kim | |
| 2003/0154867 A1 * | 8/2003 | Kim | A47J 19/025 99/510 |
| 2009/0064875 A1 | 3/2009 | Trovinger | |
| 2012/0266762 A1 * | 10/2012 | Wang | A47J 19/025 99/504 |
| 2013/0074707 A1 | 3/2013 | Asbury | |
| 2017/0303723 A1 | 10/2017 | Sedlmaier | |

* cited by examiner

HORIZONTAL JUICE EXTRACTOR

This application is the U.S. National Phase application under 35 U.S.C. § 371 of International Application No. PCT/EP2015/072503, filed on Sep. 30, 2015, which claims the benefit of International Application No. 14189084.8 filed on Oct. 15, 2014. These applications are hereby incorporated by reference herein.

FIELD OF THE INVENTION

The present invention relates to a horizontal juice extractor comprising a food processing chamber comprising a juice outlet, a food entry section having a food inlet in an upper portion and a food compression section extending from the food entry section and having a food pulp outlet; a spindle extending through the food processing chamber for transporting food from the food entry section through the food compression section, said spindle comprising a body and a helical member extending from said body; and a drivetrain adapted to rotate the spindle.

BACKGROUND OF THE INVENTION

Electric juice extractors such as horizontal masticating juicers have been used for many decades now. An example of such a horizontal masticating juicer is for instance provided by US 2009/064875 A1. In such juice extractors, food products to be juiced are inserted into the juice extractor and the solid constituents, e.g. food fibres, sometimes referred to as pulp, is separated from the juice, with the juice and pulp being expelled from the juice extractor through separate outlets. In order to further aid the separation of the juice from the pulp, such juice extractors may further comprise a filter for capturing pulp from the juice to be expelled, which is typically placed such that the extracted juice must pass the filter before it is expelled from the juice extractor through the juice outlet.

Such horizontal masticating juicers have a number of drawbacks that hamper the commercial success of such juicers. For instance, the lifetime of such a juice extractor can be limited due to mechanical failure of the housing at a distal end of the juice extractor relative to the drivetrain.

GB 1,000,773 discloses a press and cage assembly for expressing fluid from a fluid bearing material comprising a plurality of elongated grid bars separable from the framework of the press and rigid spacers positioned between adjacent pairs of grid bars so as to provide substantially unrestricted fluid flow passages between the grid bars. The grid bars are located in the feeder section and press section of the assembly. This has the disadvantage that liquid collection is cumbersome, as it is spread over a relatively large area.

Moreover, the cleaning process after use of the juice extractor is rather involved, in particular for the filter, as it is difficult to remove pulp residue, e.g. food fibres, from the filter apertures. This typically requires cleaning implements such as brushes, for which it may be cumbersome to apply these cleaning implements to the filter such that all apertures can be accessed with the cleaning implements.

SUMMARY OF THE INVENTION

The present invention seeks to provide a horizontal juice extractor with good mechanical stability and aesthetic appearance.

According to an aspect, there is provided a horizontal juice extractor comprising a main body delimiting a food processing chamber comprising a juice outlet, a food entry section having a food inlet; and a food compression section extending from the food entry section and having a food pulp outlet; a spindle extending through the food processing chamber for transporting food from the food entry section through the food compression section, said spindle comprising a body and a helical member extending from said body; and a drivetrain adapted to rotate the spindle, wherein the food compression section is located in between the food entry section and said drivetrain and wherein the food entry section comprises said juice outlet at or near a distal end of said main body relative to the drivetrain, wherein the juice outlet is vertically displaced relative to the food inlet.

By expelling the pulp from the horizontal juice extractor proximal to the drivetrain and expelling the juice from the horizontal juice extractor distal to the drivetrain, the horizontal juice extractor of the present invention gives the visual impression of producing juice rather than producing pulp, as the distal outlet is predominantly visible in normal use of the horizontal juice extractor. This therefore gives the horizontal juice extractor an improved aesthetic appearance, which improves the appeal of the horizontal juice extractor and therefore its marketability. Moreover, it produces the juice in a more accessible position, thereby improving the user friendliness of the horizontal juice extractor, for instance because it facilitates a user to place a large glass or other receptacle for collecting the juice under the juice outlet.

In an embodiment, the horizontal juice extractor further comprises a pulp restriction element in the food compression section, said spindle terminating at the pulp restriction element, the pulp restriction element comprising a plurality of apertures causing food pulp transported by the spindle to be expelled into the food pulp outlet; and a plurality of juice channels delimited by the spindle and extending from the pulp restriction element to the juice outlet. This ensures that the main body of the horizontal juice extractor can better cope with the forces in the pulp restriction area whilst effectively extracting and transporting juice towards the juice outlet.

The spindle may be coupled to the drivetrain by a drive shaft engaging with said body, the drive shaft extending through a region of the food compression section proximal to the drivetrain, wherein the pulp outlet is in a lower portion of the region. This facilitates the expulsion of the pulp through the pulp outlet without blocking this region. In this respect, it is preferred that the pulp outlet extends over a full width (W) of the region, as it has been found that this arrangement is particularly effective in expelling pulp from the horizontal juice extractor. The region may have an upper portion delimited by curved corners in some embodiments to further assist in forcing the pulp downward through the pulp outlet.

In order to assist in the pulp compression, the spindle may have a decreasing outer diameter, which may be combined with an increasing core diameter, in the direction from the food entry section towards the pulp outlet such that the available volume for the pulp on the spindle is gradually reduced in the direction of the drivetrain and the pulp outlet.

Alternatively or additionally, the pitch and/or the height of the helical member may decrease in the direction from the food entry section towards the pulp outlet at least inside the food compression section to gradually reduce the available volume for the pulp on the spindle, thereby gradually compressing the pulp.

Alternatively or additionally, the inner dimensions of the food compression section may decrease in a direction from the food entry section towards the pulp outlet to gradually reduce the available volume for the pulp between the spindle and the food compression section, thereby gradually compressing the pulp.

In a further embodiment, the horizontal juice extractor further comprises a filter for filtering the extracted juice. Such a filter may assist in reducing the pulp content in the juice expelled from the horizontal juice extractor through the juice outlet.

The filter may be a telescopic filter including a first module having a plurality of first protrusions engaged with a second module having a plurality of second protrusions such that the telescopic filter can be axially extended from an engaged position in which the first protrusions and the second protrusions cooperate to define a plurality of apertures to an extended position for cleaning the first module and the second module. The provision of such a telescopic filter facilitates the cleaning process of such a filter due to the fact that the apertures can be significantly widened by telescopically extending the filter, such that the filter may be cleaned simply by rinsing without the need for cleaning tools such as brushes. Such a telescopic filter for instance may be designed as a unit in which the first and second modules are permanently engaged with each other, such that the first and second modules cannot be (easily) separated from each other to avoid inadvertent separation of these modules.

Alternatively, the filter may be a modular filter including a first module and a second module, the filter further comprising a plurality of apertures each delimited by the first module and the second module. The ability to separate the first and second modules into separate modules may further facilitate the cleaning process of the filter.

In an embodiment of such a modular filter, the first module comprises a first body from which a plurality of first protrusions extends; and the second module comprises a second body from which a plurality of second protrusions extends, wherein the first protrusions and the second protrusions are shaped to cooperate such that said apertures are at least partially delimited by said first protrusions and said second protrusions. In such an embodiment, when disassembling the modular filter into separate modules, the apertures are significantly widened due to the fact that neighbouring protrusions of a particular module are no longer separated by a protrusion of the other module of the filter. This therefore facilitates a cleaning process for which cleaning implements such as brushes are not required, as such a filter can be effectively cleaned simply by rinsing.

The filter may have a planar or arcuate shape.

In an embodiment in which the food inlet is closer to the food compression section than the juice outlet, the filter may have an annular shape for surrounding a part of said spindle above the juice outlet to effectively prevent pulp from escaping the horizontal juice extractor through the juice outlet.

In a particularly advantageous embodiment of such a modular filter, the positioning of the first module relative to the second module is adjustable, said adjustment adjusting the size of the apertures. Such adjustable apertures for instance may be used to control the pulp content in the juice, e.g. to produce clear or cloudy juices, or may be used to dimension the apertures in accordance with the type of food that is being juiced, for instance to match the aperture dimensions to typical average fiber length in the relevant pulp, thereby controlling the amount of pulp entering the juice and preventing the apertures being clogged up by the pulp.

BRIEF DESCRIPTION OF THE DRAWINGS

Embodiments of the invention are described in more detail and by way of non-limiting examples with reference to the accompanying drawings, wherein.

DETAILED DESCRIPTION OF THE EMBODIMENTS

Figure 1:
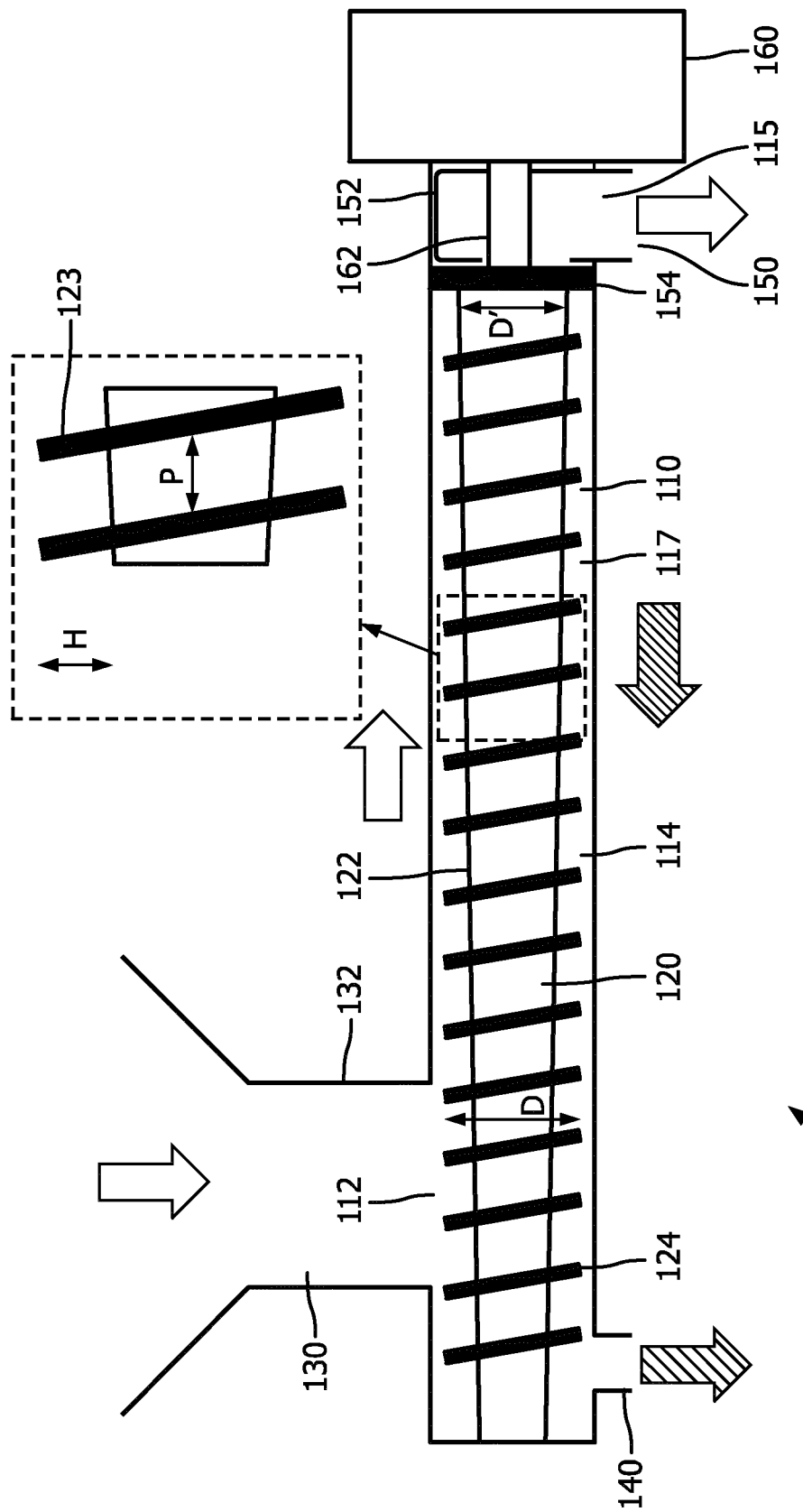
FIG. 1 schematically depicts a horizontal juice extractor according to an embodiment.

It should be understood that the Figures are merely schematic and are not drawn to scale. It should also be understood that the same reference numerals are used throughout the Figures to indicate the same or similar parts.

Where reference is made to a horizontal juice extractor, it should be understood that the term 'horizontal' refers to the predominant orientation of the spindle of the juice extractor when the juice extractor is placed on a horizontal surface. In some embodiments, the term 'horizontal' refers to the dominant component of the spindle orientation when this orientation is decomposed in a horizontal and a vertical component, i.e. to orientations in which the horizontal component of this orientation is larger than the vertical component. In some embodiments, the vertical component of this orientation is less than 40%, less than 30%, less than 20% or less than 10% of the overall orientation. In some embodiments, the vertical component is zero or near-zero.

FIG. 1 schematically depicts a horizontal juice extractor 100 according to an embodiment. The horizontal juice extractor 100 may be a masticating juice extractor in at least some embodiments. The horizontal juice extractor 100 comprises a main body delimiting a food processing chamber 110 in which a spindle 120 is housed. The juice extractor 100 further comprises a drivetrain 160 including a gearbox (not shown) that is coupled to the spindle 120, for instance through a drive shaft 162, and is arranged to rotate the spindle 120 during operation of the horizontal juice extractor 100.

The food processing chamber 110 comprises a food entry section 112 that is adapted to receive food inserted into the juice extractor 100 through a food inlet 130 and a food compression section 114 in which the food is compressed to extract the juice from the food. The food inlet 130 may have any suitable shape, e.g. a funnel shape, and typically includes a wall portion 132 that is proximal to the food compression section 114 for reasons that will be explained in more detail later.

In at least some embodiments, the food compression section 114 cooperates with the spindle 120 to compress chunks of food that are transported by the spindle 120 from the food entry section 112 to the food compression section 114. Such compression is typically realized by gradually reducing the available volume housing the chunks of food as these chains are being transported from the food entry section 112 through the food compression section 114 towards a pulp outlet 150. This compression creates a pressure gradient of increasing pressure from the food entry section 112 in the direction of the pulp outlet 150. This pressure gradient forces the juice squeezed out of the chunks of food in the direction of the food entry section 112, where it can exit the juice extractor 100 through juice outlet 140. This for instance may be achieved by remaining a small gap 117 between the spindle 120 and the inner wall of the food compression section 114, wherein the gap 117 is dimensioned such that the extracted juice can flow through the gap towards the juice outlet 140, whilst preventing food pulp remaining on the spindle 120 from entering this gap, i.e. the small gap 117 acts as a juice channel in a bottom portion of the food processing chamber 110.

The juice outlet 140 is located in a bottom portion of the food processing chamber 110 such that the juice outlet 140 is located at or near a distal end of the main body relative to the drivetrain 160. This has the advantage that the horizontal juice extractor 100 produces the juice in a particularly accessible location, i.e. at its distal end, which facilitates juice collection and furthermore gives the appearance of the horizontal juice extractor 100 producing juice rather than pulp in case of prior art horizontal juice extractors having a pulp outlet at such a distal end, which is less visually appealing. The juice outlet 140 may be arranged such that the juice outlet 140 is further away from the drivetrain 160 than the food inlet 130, i.e. is closer to the distal end of the horizontal juice extractor 100, thereby for instance enabling a large glass or other suitable receptacle for collecting the juice to be placed under the juice outlet 140. The horizontal juice extractor 100 preferably comprises a single juice outlet 140 in this location to facilitate easy collection of the expelled juice.

In contrast, the pulp outlet 150 is located at a proximal end of the food processing chamber 110 relative to the drivetrain 160, i.e. in a region 115, which may be a terminal region of the food compression section 114 or a region immediately adjacent to the food compression section 114. This has the advantage that the pulp is expelled from the horizontal juice extractor 100 out of immediate view of the user of the horizontal juice extractor 100, thus further improving its appearance.

Moreover, in order to effectively extract the juice from the food pulp, the horizontal juice extractor 100 may further comprise a pulp restriction element 154, e.g. a plate or the like, which may be placed in any suitable location, such as in the food compression section 114 such that the helical spindle 120 terminates at the pulp restriction element 154. The pulp restriction element 154 typically comprises one or more apertures that cause the pulp transported by the spindle 120 to be forced through the apertures into the region 115 from which the pulp is expelled from the horizontal juice extractor 100 through the pulp outlet 150. This restriction increases the pressure exerted on the pulp, thus forcing the juice to be removed from the pulp.

Figure 3:
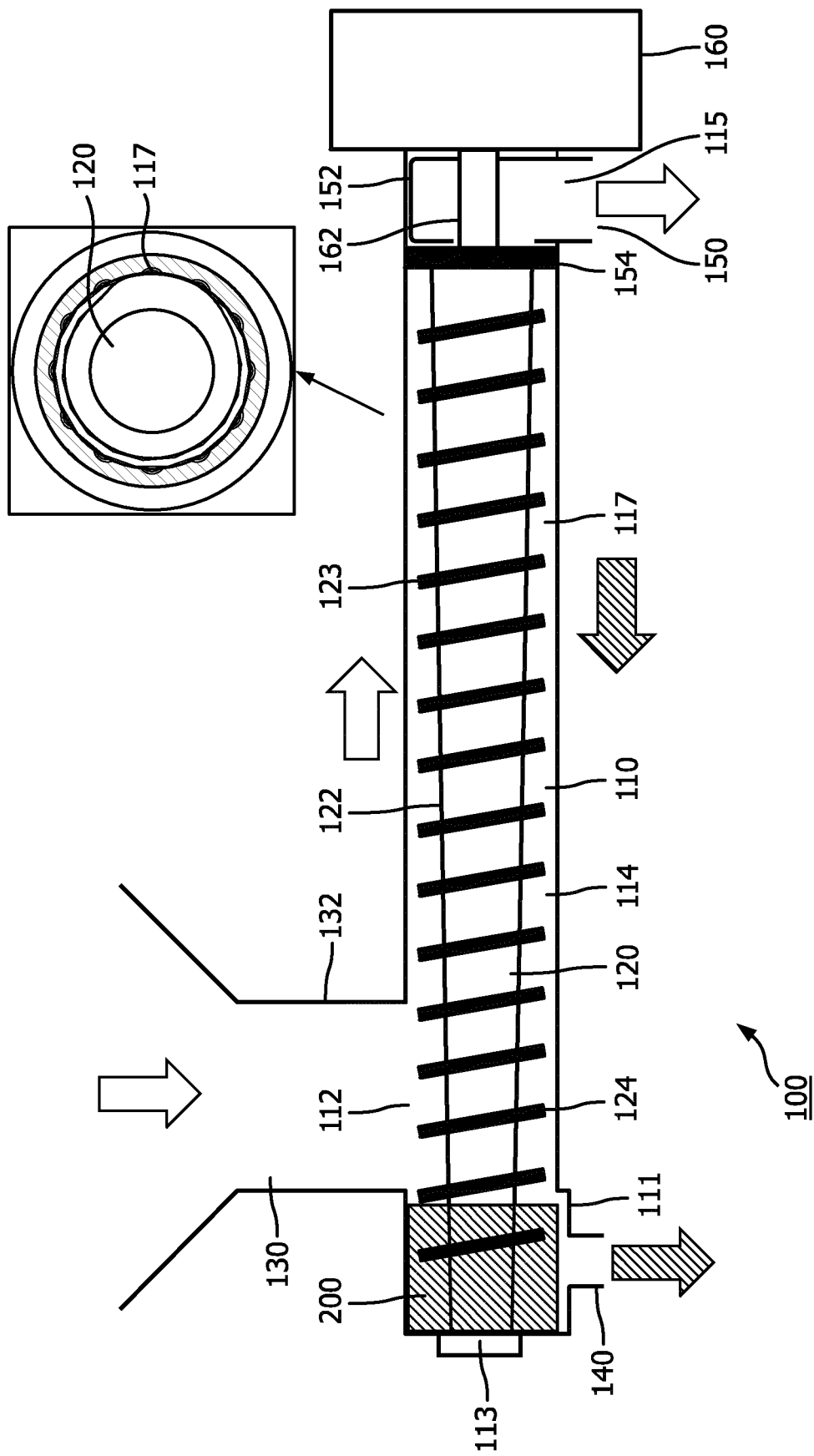
FIG. 3 schematically depicts a horizontal juice extractor according to yet another embodiment.

The removed juice may be collected in one or more juice channels formed by the gaps 117 (shown in the inset of FIG. 3 depicting the cross-section of the horizontal juice extractor as identified by the dashed line), and transported, e.g. gravity-fed and/or pressure gradient-driven, towards the juice outlet 140, as indicated by the hashed block arrows. The juice channels may be delimited by the spindle 120 and may extend from the pulp restriction element 154 towards the juice outlet 140.

The region 115 may comprise a pulp deflection member 152 for deflecting the pulp towards the pulp outlet 150. This will be explained in more detail later. In an embodiment, the pulp deflection member 152 and the pulp restriction element 154 may form part of a single unit, which for instance reduces the number of components of the horizontal juice extractor 100 and may facilitate the cleaning process of these components.

Another important advantage of having the pulp restriction element 154 proximal to the drivetrain 160 is that it becomes more straightforward to design the main body of the horizontal juice extractor 100 such that the main body can cope with the forces generated in this pulp restriction area. In particular, because this pulp restriction area is located relatively close to the drivetrain 160, which is typically mounted in relatively rigid housing, a relatively rigid portion of the main body including this pulp restriction area may be directly coupled to the relatively rigid housing of the drivetrain 160, thereby ensuring that the positioning of this part of the main body relative to the pulp restriction element 154 can be well-maintained. It is noted that when such a pulp restriction element 154 is located distal to the drivetrain 160, i.e. at a distal end of the horizontal juice extractor 100, the provision of such a relatively rigid portion of the main body is much more cumbersome, given that the relatively rigid portion is typically separated from the housing of the drivetrain 160 by a more flexible portion of the main body for cost and/or weight reasons. As will be appreciated by the skilled person, in such a scenario, it is far from straightforward to provide the portion of the main body in the pulp restriction area with the necessary rigidity, given that this portion cannot be directly anchored to another rigid body such as the housing of the drivetrain 160.

The spindle 120 comprises a body 122 carrying a helical cutting portion 124 that will be explained in more detail later. The helical cutting portion 124 is present on the body 122 at least in the food entry section 112 of the food processing chamber 110. The helical cutting portion 124 may extend over the whole of the spindle 120. Alternatively, the helical cutting portion 124 may cooperate with a helical food transport portion adjoining the helical cutting portion 124, wherein the helical food transport portion is arranged to transport the food chunks cut by the helical cutting portion 124 from the food entry section 112 towards and through the food compression section 114.

In at least some embodiments, the spindle 120 will have a constant outer diameter D, which is the combination of the diameter D' of the body 122 and the height H by which the helical member 123 extends from the body 122 as can be seen in the inset showing a magnified view of the portion of the spindle 120 highlighted by the dashed box in FIG. 1. It is noted for the avoidance of doubt that the inner diameter D' and the height H may not be constant; for instance, in order to aid the food compression process, the body 122 may be frustoconical body having a gradually increasing diameter D' in the direction of the pulp outlet 150 such that the height H of the helical member 123 reduces at the same rate and in the same direction in order to ensure that the outer diameter D of the spindle 120 remains constant.

The inset further depicts the pitch P of the helical member 123, i.e. the distance between neighbouring turns of the helical member 123. In some embodiments, the pitch P is constant over the full length of the spindle 120, i.e. throughout the food processing chamber 110. In some alternative embodiments, the pitch P may be variable, e.g. decrease at least in a part of the food compression section 114 in order to aid with the compression of the food chunks inside the food compression section 114 by gradually reducing the available volume for the food chunks transported towards the pulp restriction element 154.

In another embodiment, the horizontal juice extractor 100 further comprises a second and optionally a third helical member on the spindle 120, which additional helical members may start on the spindle 120 downstream from the food inlet 130. Such additional helical members reduce the available volume for the pulp on the spindle 120, thereby compressing the pulp and extracting the juice therefrom.

The above measures are measures to reduce the volume available to the food chunks by reducing the volume of the compartments defined on the spindle 120. Alternatively or additionally, the food compression section 114 of the food processing chamber 110 may have a progressively decreasing dimension, e.g. a progressively decreasing diameter, in the food transport direction, such that the gap between the spindle 120 and the inner wall(s) of the food compression section 114 is progressively reduced to reduce the volume available to the food chunks as the food chunks are being transported through the food compression section 114. For the avoidance of doubt, this embodiment may be combined with any of the embodiments in which the volume of the compartments defined on the body 122 of the spindle 120 is progressively reduced in the food transport direction through the food compression section 114.

As previously mentioned, the spindle 120 is typically arranged to transport food chunks from the food inlet 130 towards the food compression section 114 as indicated by the clear block arrows in FIG. 1. In the horizontal juice extractor 100 according to the present invention, this implies that the spindle 120 is dimensioned such that the food chunks are transported towards the drivetrain 160. In other words, the helical cutting member 124 of the spindle 120 is shaped such that upon rotation of the spindle 120 by the drivetrain 160, the food chunks are transported towards the drivetrain 160, in contrast with conventional horizontal juice extractors in which the pulp outlet 150 is typically distal to the drivetrain 160, such that the spindle 120 is dimensioned to transport food chunks away from the drivetrain 160.

In at least some embodiments, the spindle 120 is made of a plastic material. This has the advantage that the spindle 120 can be manufactured cheaply, for instance by molding or casting techniques and is light-weight. This facilitates easy handling of the spindle 120, for instance when it is removed from the juice extractor 100 for cleaning purposes, e.g. for cleaning in a dishwasher.

Figure 2:
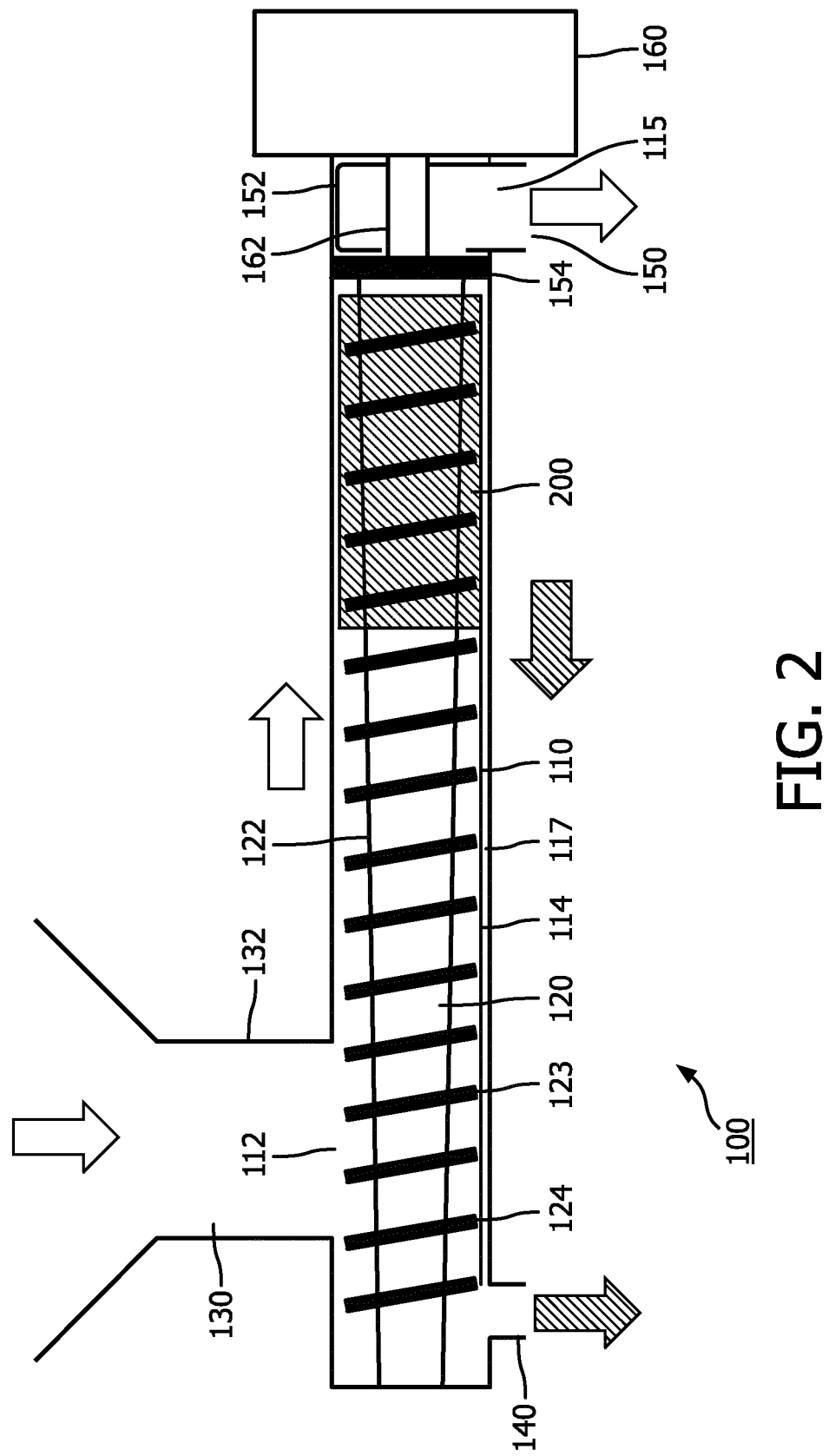
FIG. 2 schematically depicts a horizontal juice extractor according to another embodiment.

In FIG. 2, the horizontal juice extractor 100 of FIG. 1 further comprises a filter 200 arranged such that the juice extracted from the food pulp in the food compression section 114 must pass the filter 200 in the food compression section 114. The filter 200 typically comprises a plurality of apertures (not shown) for passing the juice and capturing pulp residues, such that the juice collected in the gap 117 acting as a juice channel is relatively free of such pulp residues. In an embodiment, the filter 200 may have a planar or arcuate shape and be located in between the spindle 120 and the gap 117 to collect the juice extracted from the food. In an alternative embodiment, the filter 200 may be an annular filter enveloping the spindle 120. The filter 200 may be secured in the main body of the horizontal juice extractor 100 in any suitable manner.

In an embodiment, the filter 200 may be a modular filter that can be disassembled for easy cleaning, e.g. by rinsing. Alternatively, in case such disassembly is undesirable, the modular filter may be a telescopic filter that can be extended from an engaged configuration to a disengaged configuration for easy cleaning, e.g. by rinsing. These filter embodiments will be explained in more detail below.

At this point, it is noted that the filter 200 may be located in any suitable location of the horizontal juice extractor 100. As shown in FIG. 3 by way of non-limiting example, the filter 200 may alternatively be located over the juice outlet 140 in the food entry section 112. In this embodiment, the juice channel defined by the gap 117 may terminate in the filter 200 such that the juice and pulp transported through the juice channel are collected in the filter 200, and the pulp is separated from the juice by the filter 200 before the juice exits the horizontal juice extractor 100 through juice outlet 140.

In an embodiment, the filter 200 is located in a compartment 111 that may be removed or opened to provide access to the filter 200 for cleaning purposes. The filter 200 may be removed in its entirety from the compartment 111. Alternatively, for instance in case of a modular or telescopic filter 200, part, e.g. a module, of the filter 200 may be secured in the compartment 111, e.g. integrated in the main body of the horizontal juice extractor 100, wherein the other module(s) of the filter 200 may be removed from the compartment 111 for cleaning purposes. A knob or dial 113 may be present at an outer surface of the main body, e.g. an outer surface of the compartment 111, for easy access by a user of the horizontal juice extractor 100 to adjust the aperture size of the filter 200, as will be explained in more detail below. The aperture size may be adjusted to control the pulp content in the juice produced by the horizontal juice extractor 100.

Figure 4:
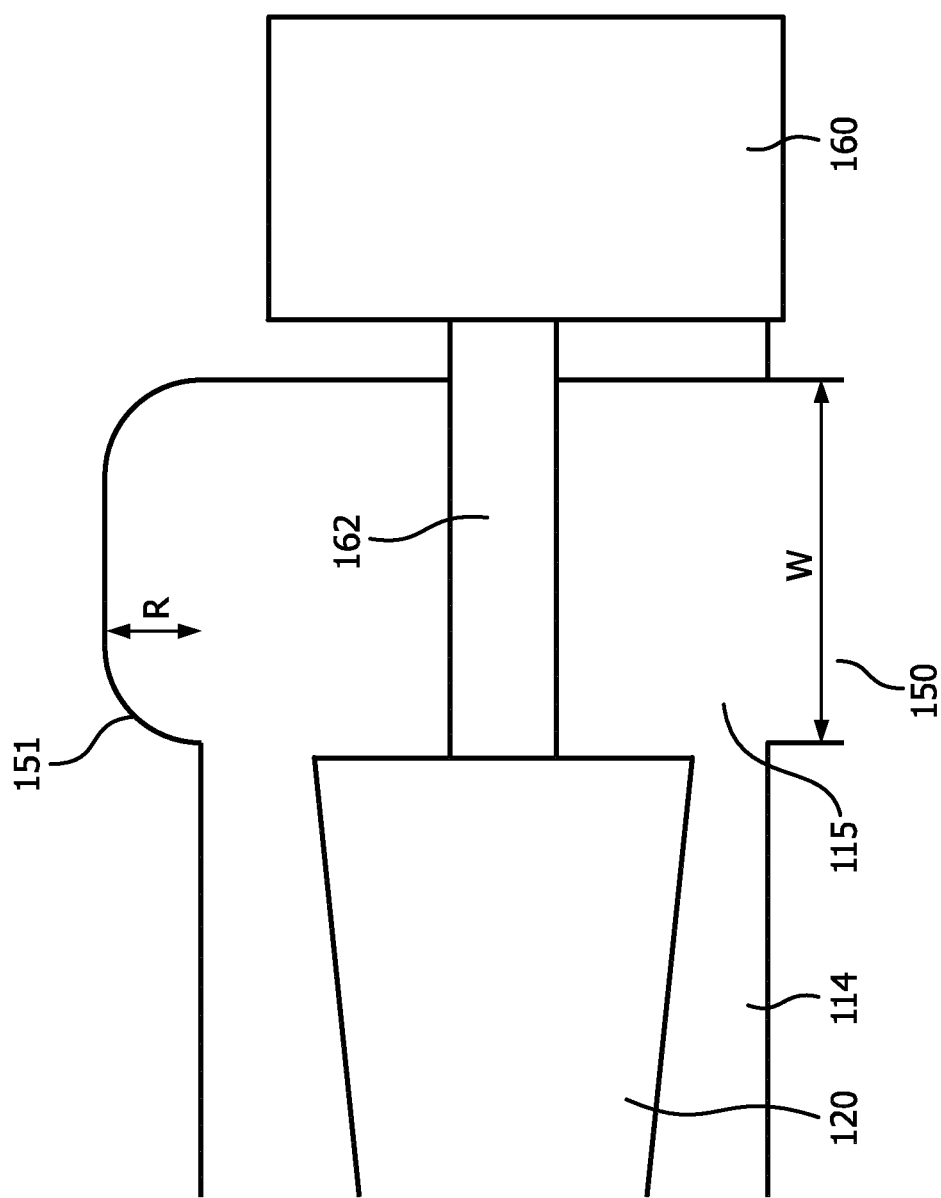
FIG. 4 schematically depicts an aspect of a horizontal juice extractor according to an embodiment.

FIG. 4 schematically depicts a particularly advantageous embodiment of the region 115 in more detail. It has been found by the present inventors that in the horizontal juice extractor 100 according to embodiments of the present invention wherein the pulp is transported towards the drivetrain 160, the geometry of the region 115 has a marked influence on the risk of blocking region 115 or a part of the food compression chamber 114 adjacent to the region 115. For instance, when using a relatively narrow pulp outlet 150 and/or a curved pulp deflector in an upper portion of the region 115 for deflecting pulp towards the pulp outlet 150, it has been found that such geometries when used in the horizontal juice extractor 100 according to embodiments of the present invention may lead to pulp blockages at least for certain food types. In particular, when the width W of the pulp outlet 150 is substantially smaller than the overall width of the region 115, it may be difficult to avoid such blockages.

In an embodiment, such blockages are effectively avoided by ensuring that the width W of the pulp outlet 150 is substantially equal to the overall width of the region 115, thereby creating a free-fall condition for the pulp expelled from the horizontal juice extractor 100. Preferably, to further reduce the risk of such blockages, the spindle 120 is coupled to the drivetrain 160 by a drive shaft 162 which has a substantially smaller diameter than the spindle 120, which drive shaft 162 extends through the region 115.

In an embodiment, the region 115 may further comprise curved corners 151 in an upper portion of the region 115, which upper portion may be radially extended in an upward direction from the exit of the adjacent region of the food compression chamber 114 by an amount R to further reduce the risk of pulp blockages as this elevated upper portion further reduces the risk of the pulp sticking to the upper portion of the region 115. In an embodiment, R may be in the range of 10-15 mm and W may be in the range of 30-45 mm to obtain a region 115 that may handle pulp from a wide variety of food products without blocking the region 115.

As previously mentioned, the horizontal juice extractor 100 may further comprise a filter 200 for filtering pulp from the extracted juice. In the remainder, a number of particularly advantageous embodiments of such a filter 200 will be described in more detail. It should be understood that although these embodiments may be used in conjunction with the horizontal juice extractor 100 of the present invention, the applicability of these embodiments is not limited to the horizontal juice extractor 100 of the present invention. In other words, the below embodiments of the filter 200 may be used in any suitable juice extractor.

Figure 5:
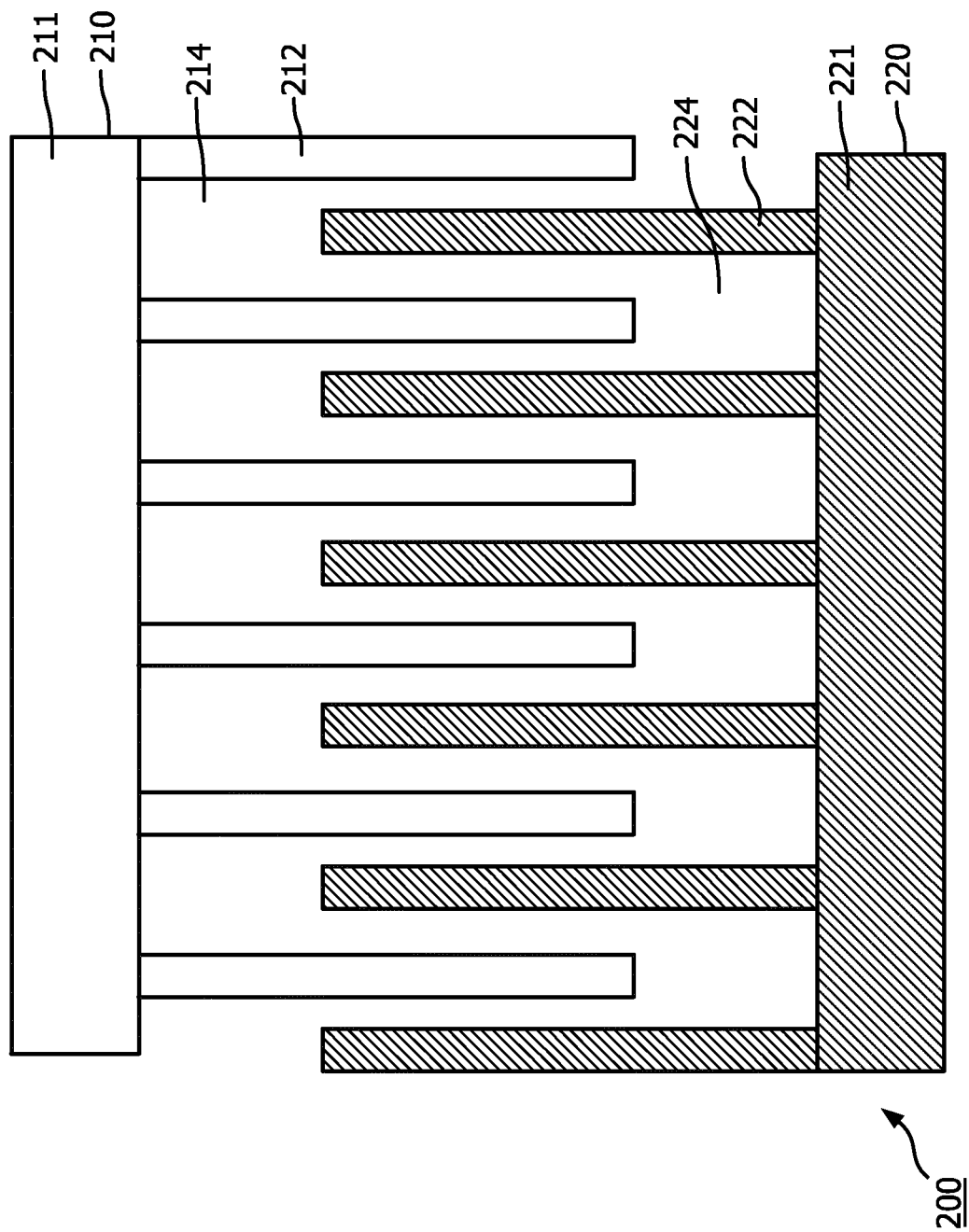
FIG. 5 schematically depicts a modular filter for a horizontal juice extractor according to an embodiment.

A first embodiment of a modular filter 200 is schematically depicted in FIG. 5. The modular filter has a first module 210 and a second module 220 that are designed to engage with each other to form an assembled filter 200, whereas in disengaged form the first module 210 and the second module 220 may be easily cleaned, e.g. by rinsing with water. The first module 210 comprises a first body 211 from which a plurality of first protrusions 212 extend. Neighbouring first protrusions 212 are separated by respective first gaps 214. The second module 220 comprises a second body 221 from which a plurality of second protrusions 222 extend. Neighbouring second protrusions 222 are separated by respective second gaps 224.

The first body 211 and the second body 221 typically have matching shapes, which for instance may be a planar shape or an arcuate shape. Similarly, the first protrusions 212 and the second protrusions 222 have matching, e.g. identical or complimentary, shapes. The first protrusions 212 and the second protrusions 232 may have any suitable shape, such as a shape having a constant width as shown in FIG. 5. The first gaps 214 are dimensioned such that they can receive the second protrusions 222 and the second gaps 224 are dimensioned such that they can receive the first protrusions 212 when the first module 210 is engaged with the second module 220 to assemble the modular filter 200. The first module 210 and the second module 220 may be made of any suitable material, e.g. a metal, metal alloy, plastics material and so on, which material may be dishwasher safe such that the respective modules may be cleaned in a dishwasher.

Figure 6:
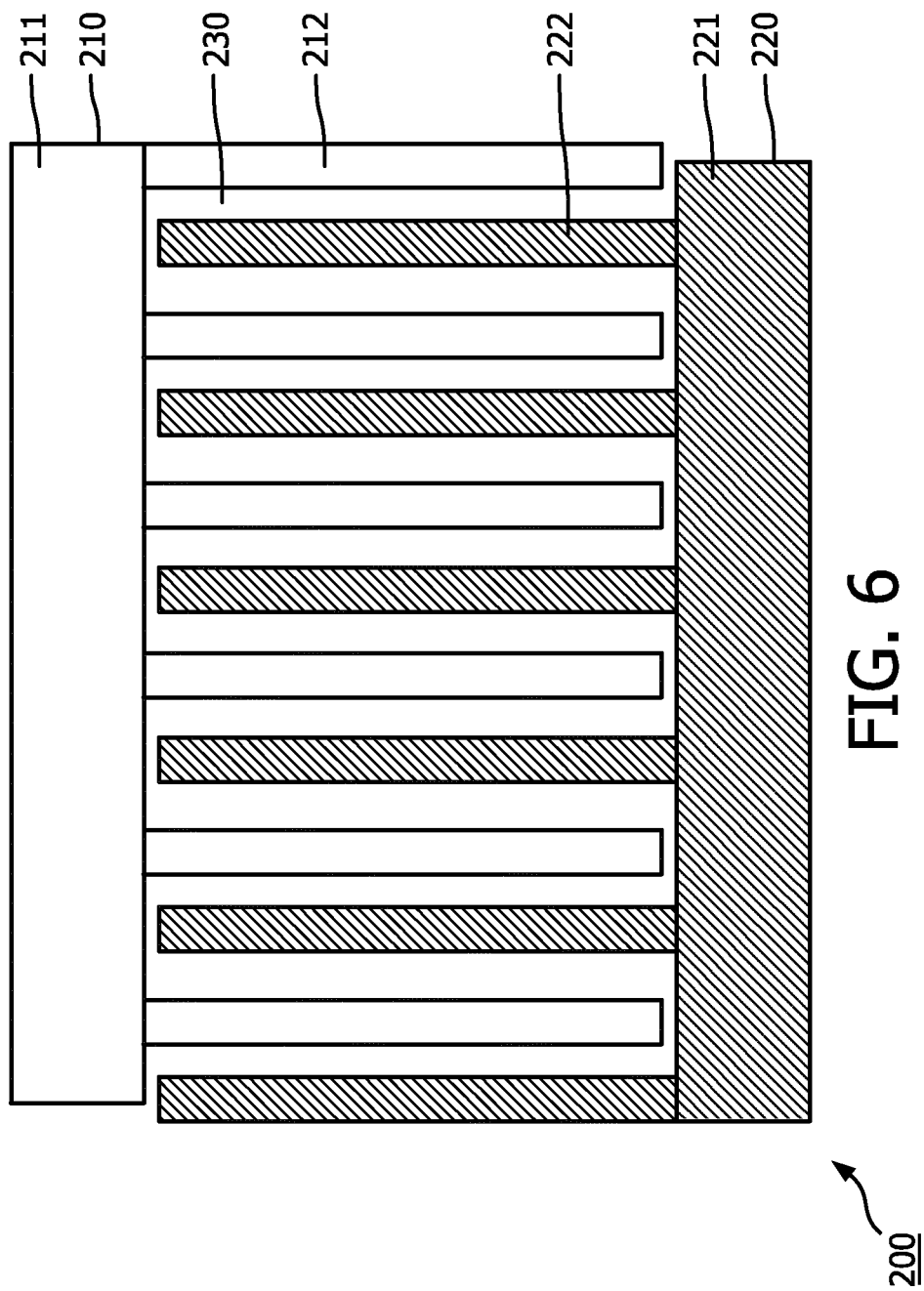
FIG. 6 schematically depicts the modular filter of FIG. 5 in an engaged state.

FIG. 6 schematically depicts the modular filter 200 of FIG. 5 in an assembled form. In the assembled form, the first protrusions 212 cooperate with the second protrusions 222 to define apertures 230 delimited by the first protrusions 212, the second protrusions 222, the first body 211 and the second body 221. Because the apertures 230 only exist when the first module 210 and the second module 220 of the modular filter 200 are engaged with each other, the modular filter 200 is easy to clean when disassembled due to the fact that any pulp material trapped in the apertures 230 is no longer contained by the apertures 230 when the modular filter 200 is disassembled, such that such pulp material can be easily removed from the respective modules of the modular filter 200 without requiring cleaning utensils, e.g. by rinsing the first module 210 and the second module 220 or by cleaning these modules in a dishwasher.

The first module 210 may be engaged with the second module 220 in any suitable manner. By way of non-limiting example, the first protrusions 212 and/or the second protrusions 222 may have a terminal shape for engaging with a matching shape on the second body 221 and/or the first body 211.

As shown in FIG. 6, the first module 210 may be engaged with the second module 220 such that the first protrusions 212 and the second protrusions 222 are equidistantly spaced to define a plurality of equally sized apertures 230 wherein each protrusion apart from the terminal protrusions borders a pair of such apertures 230. As will be understood by the skilled person, the size of the apertures 230 determines the amount of pulp that can pass through the modular filter 200, thereby controlling the pulp content in the juice that passes through this filter.

Figure 7:
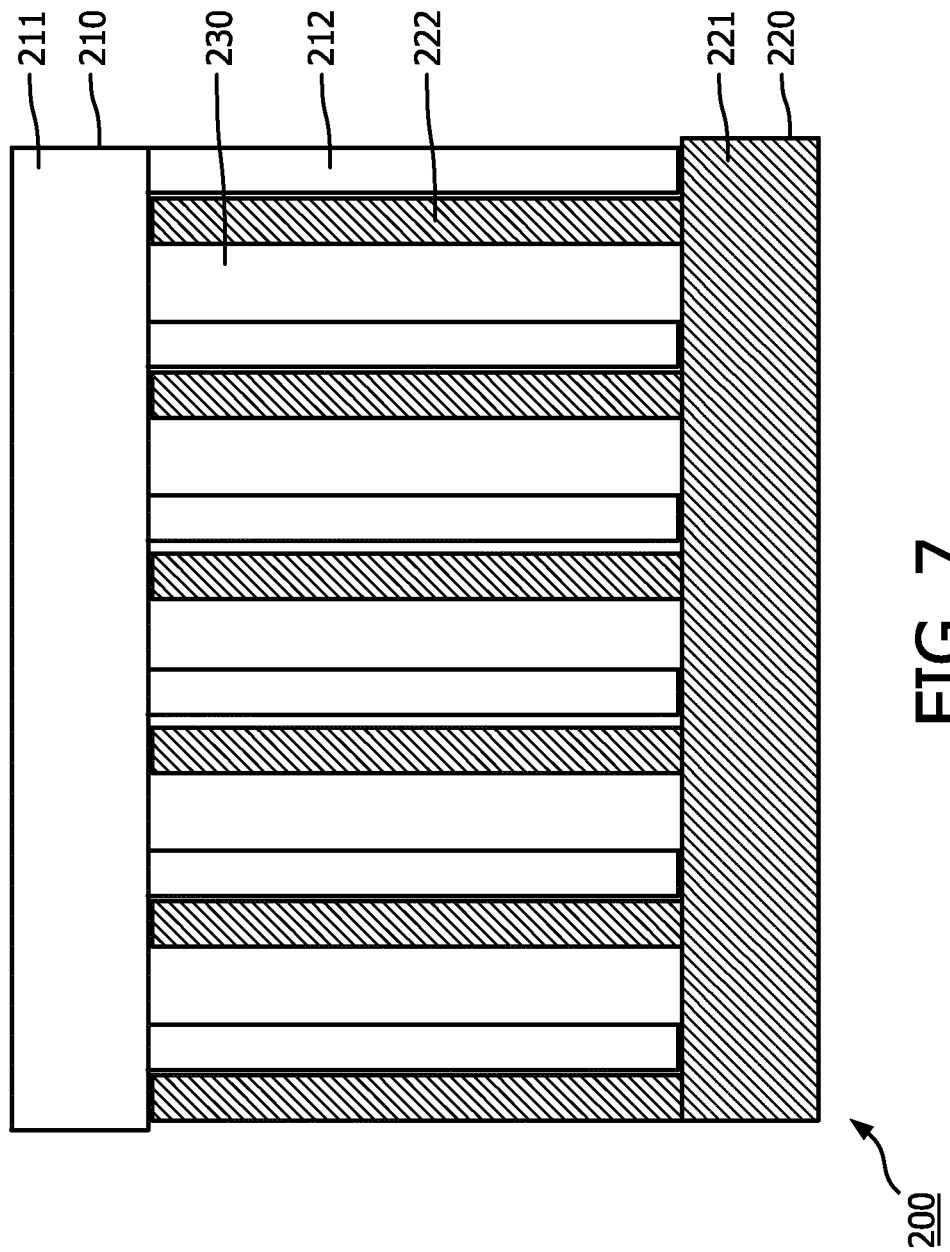
FIG. 7 schematically depicts the modular filter of FIG. 5 in another engaged state.

In an embodiment, the modular filter 200 is designed such that the size of the apertures 230 may be controlled by the engagement configuration of the first module 210 and the second module 220 in order to control the pulp content in the juice passing through the modular filter 200. An example of such an adjustable configuration is schematically shown in FIG. 7, in which the first module 200 is engaged with the second module 220 such that each first protrusion 210 abuts a second protrusion 220, such that each protrusion is bordered by an opposite protrusion on one side and an aperture 230 on the other side. Consequently, larger sized apertures 230 are formed in this configuration compared to the configuration shown in FIG. 6. Importantly, because the overall aperture area of the modular filter 200 is substantially the same in the respective configurations shown in FIGS. 6 and 7, the flow rate of the juice through the modular filter 200 is not significantly affected by the different configurations, such that the performance of a juice extractor such as the horizontal juice extractor 100 is not affected by the choice of configuration. The provision of a modular filter 200 that can be assembled in a plurality of different configurations having different aperture sizes may be achieved in any suitable manner. For instance, by way of non-limiting example, the first body 211 and/or the second body 221 may comprise a plurality of receiving portions for each opposing protrusion, i.e. a plurality of such receiving portions in each gap 214 and/or 224 such that the opposing module can be slotted into the appropriate receiving portion in order to assemble the modular filter in the desired configuration.

Figure 8:
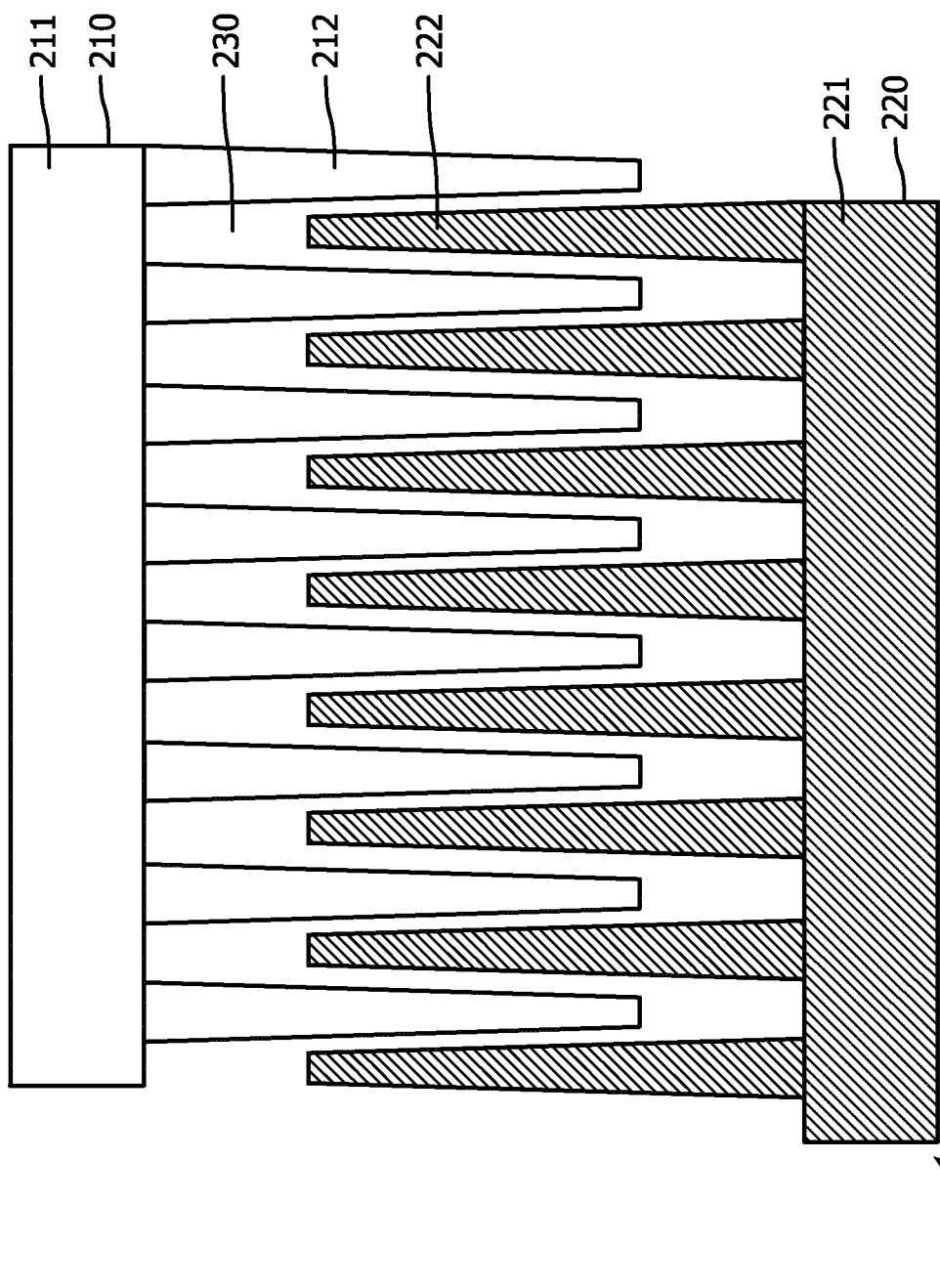
FIG. 8 schematically depicts a modular filter for a horizontal juice extractor according to another embodiment.
Figure 9:
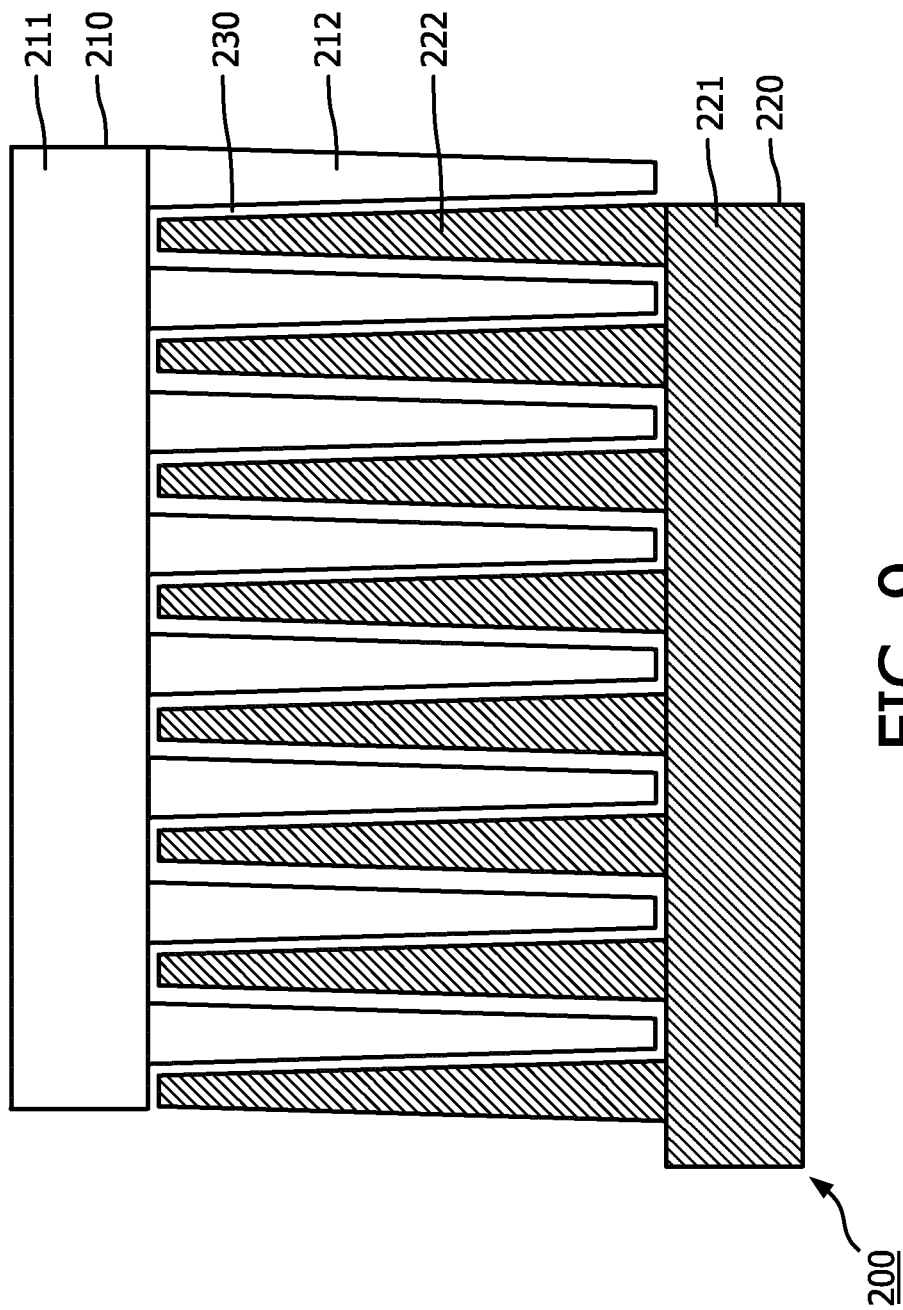
FIG. 9 schematically depicts the modular filter of FIG. 8 in an engaged state.

In the above embodiment, the size of the apertures 230 is controlled by the lateral displacement of the first protrusions 212 and the second protrusions 222 relative to each other. FIG. 8 schematically depicts an alternative embodiment of a modular filter 200 in which the size of the apertures 230 may be controlled by the shape of these protrusions. In this embodiment, the first protrusions 212 and the second protrusions 222 have a trapezoidal or tapered shape wherein each protrusion is at its widest proximal to the body from which these protrusions extend, i.e. the first body 211 and the second body 221 respectively. In this embodiment, the longitudinal displacement of the first module 210 relative to the second module 220 may be used to control the size of the apertures 230. In FIG. 8, the first module 210 is separated from the second module 220 such that the first subset of the apertures 230 is mainly formed between an end portion of a first protrusion 210, a pair of opposing second protrusions 222 and the second body 221 from which the opposing second protrusions 222 extend and a second subset of the apertures 230 is mainly formed between an end portion of a second protrusion 220, a pair of opposing first protrusions 212 and the first body 211 from which the opposing first protrusions 212 extend. The size of the apertures 230 may be controlled by controlling the longitudinal displacement of the first module 210 relative to the second module 220 as is shown in FIG. 9 in which the first module 210 is brought into close proximity to the second module 220 such that the apertures 230 are significantly reduced in size. It will be understood that in this embodiment, the overall aperture area is a function of individual aperture size, such that the flow rate of juice through the modular filter 200 is a function of the chosen configuration of the modular filter 200. The first body 211 and the second body 221 may have any suitable shape, such as a planar shape, arcuate shape or annular shape.

Figure 10:
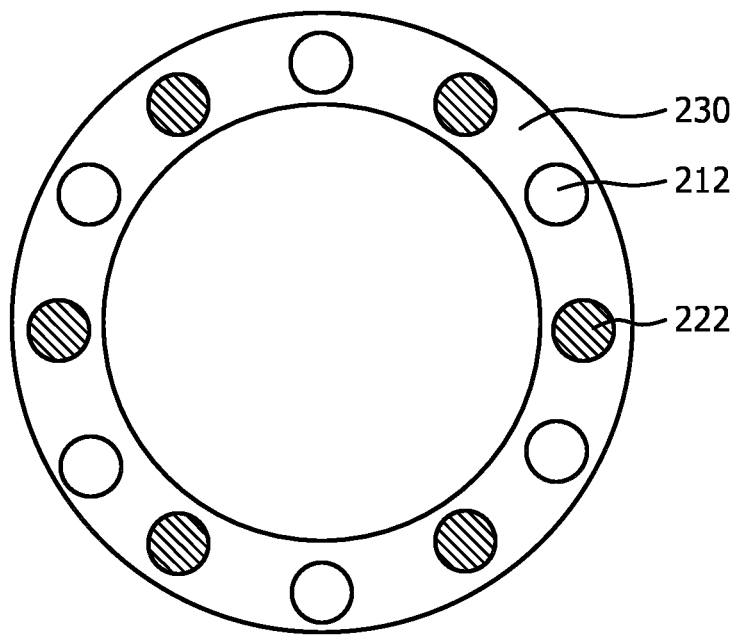
FIG. 10 schematically depicts an aspect of an annular modular filter for a horizontal juice extractor according to another embodiment in an engaged state.
Figure 11:
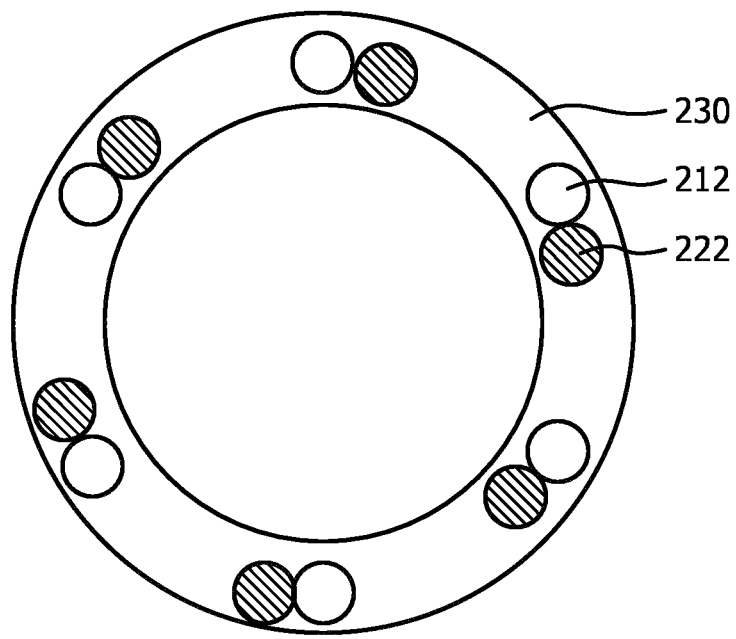
FIG. 11 schematically depicts an aspect of the modular filter of FIG. 10 in another engaged state.

FIGS. 10 and 11 schematically depict an aspect of an annular modular filter 200, e.g. a drum filter, having configurable aperture sizes, wherein the size of the apertures 230 may be controlled by rotating one of the modules relative to the other of the modules, thereby altering the positions of the first protrusions 212 relative to the second protrusions 222 as previously explained in more detail with the aid of FIG. 5-7. As before, this has the advantage that the size of the apertures may be configured to control the amount of pulp passing through the modular filter 200 whilst remaining the overall aperture area substantially constant, i.e. independent of the chosen configuration, such that the overall flow characteristics of the modular filter 200 are not significantly affected by the chosen filter configuration.

Figure 12:
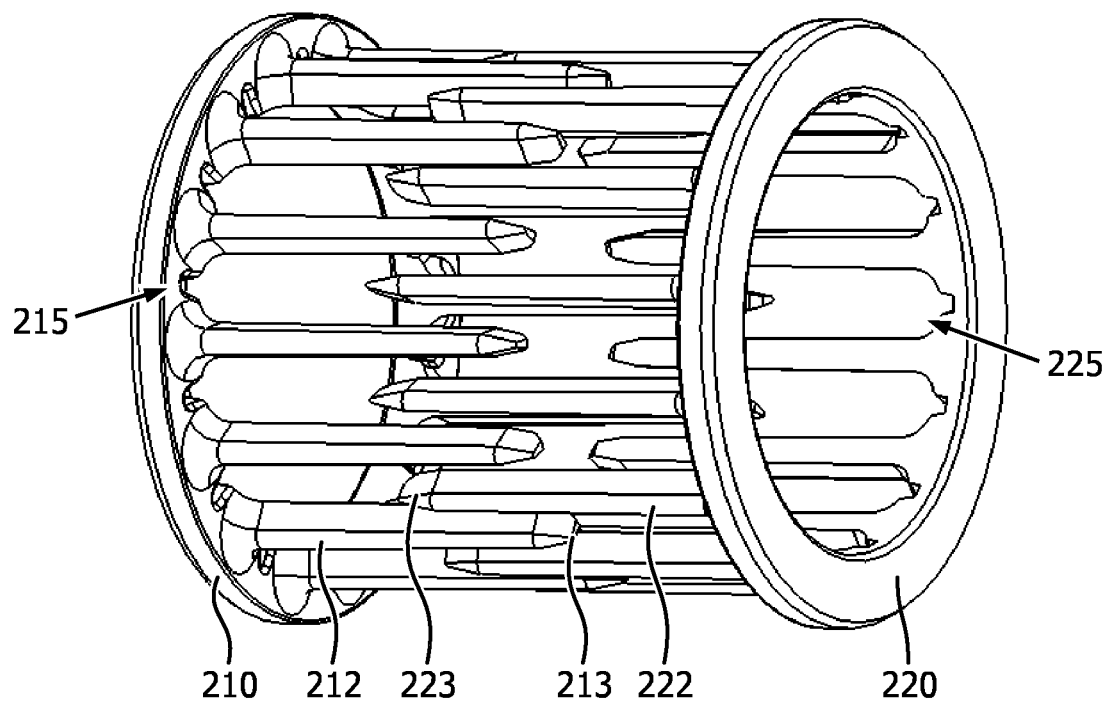
FIG. 12 schematically depicts the annular modular filter of FIG. 10 in a perspective view.
Figure 13:
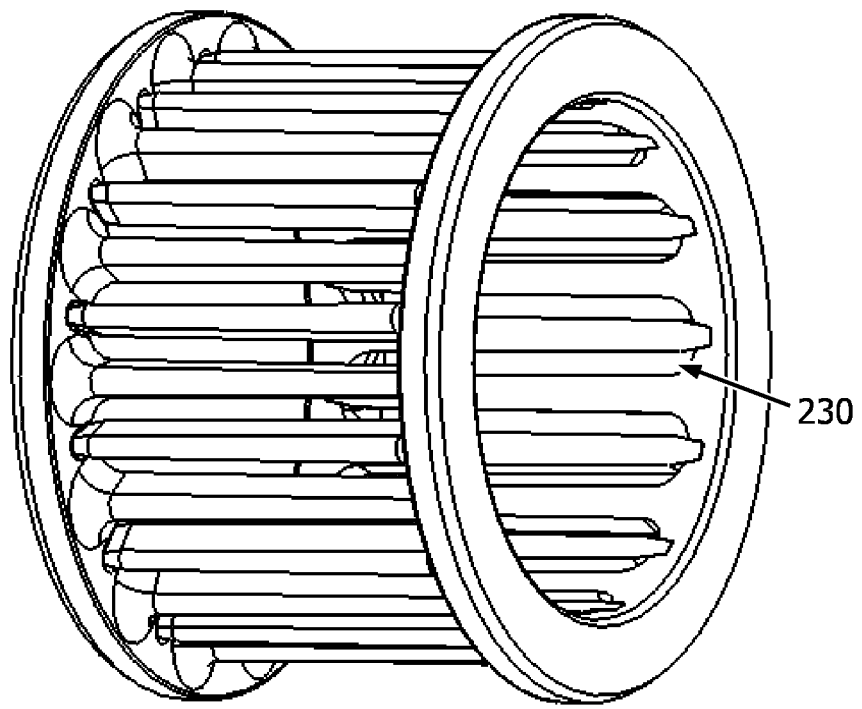
FIG. 13 schematically depicts the engaged annular modular filter of FIG. 10 in a perspective view.

FIG. 12 schematically depicts an annular modular filter 200, e.g. a drum filter in a partially assembled state, in which the first slots 215 on the first module 210 for engaging with the end portions 223 of the second protrusions 222 in the assembled state of the annular modular filter 200, as well as the second slots 225 on the second module 220 for engaging with the end portions 213 of the first protrusions 212 in the assembled state of the annular modular filter 200 are shown. A single slot 215 in between neighbouring first protrusions 212 and a single slot 225 in between neighbouring second protrusions 222 is shown by way of non-limiting example only; it will be understood from the foregoing that a plurality of such slots may be located in between neighbouring protrusions in order to configure the size of the apertures 230 of the modular filter 200 as previously explained. FIG. 13 schematically depicts the annular modular filter 200 of FIG. 12 in the assembled form, in which the apertures 230 delimited by opposing protrusions 212, 222 can be identified.

Figure 14:
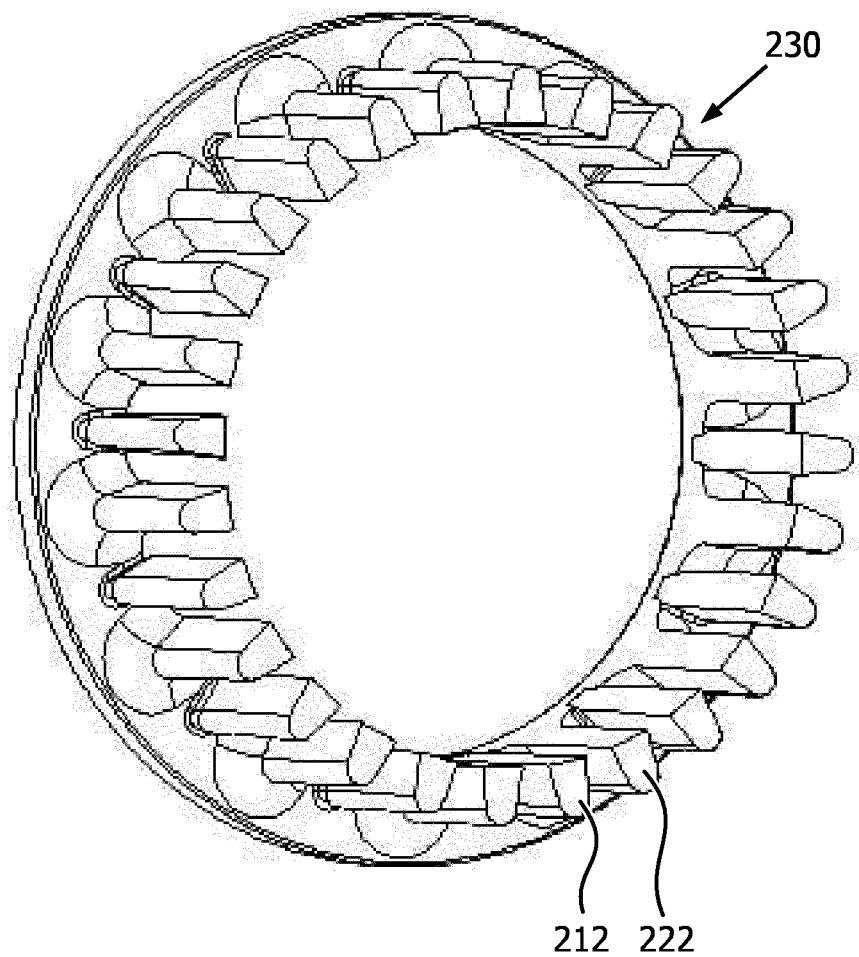
FIG. 14 schematically depicts an aspect of an annular modular filter according to an embodiment.

FIG. 14 schematically depicts a perspective view of a cross-section of an annular modular filter 200 highlighting a particularly advantageous shape of the first protrusions 212 and the second protrusions 222. In this embodiment, the first protrusions 212 and the second protrusions 222 are tapered in a radial direction such that the apertures 230 radially widen in an outward direction. This has the advantage that a relatively narrow aperture 230 is provided at the inner annular surface of the modular filter 200 as defined by the first protrusions 212 and the second protrusions 222, which effectively prevents most of the pulp from passing through the aperture 230, whilst allowing the extracted juice to freely pass through these apertures 230.

In an embodiment, the first module 210 of the annular modular filter 200 having an adjustable aperture size may be mounted in the horizontal juice extractor 100, for instance mounted in the compartment 111 such that the first module 210 may be radially displaced relative to the second module 220 using the knob 113 in order to adjust the size of the apertures 230. To this end, the knob 113 for instance may be a sprung knob that can be pulled away from the outer wall of the compartment 111 on which the knob is mounted to facilitate the radial displacement of the first module 210 relative to the second module 220. However, it should be understood that this is a non-limiting example of how the first module 210 may be mounted in the compartment 111; it will be immediately apparent to the skilled person that many other suitable arrangements are equally feasible. In an embodiment, the first module 210 may be removably mounted in the compartment 111 to facilitate cleaning of the first module 210 away from the compartment 111.

In an alternative embodiment, the modular filter 200 is designed such that it cannot be accidentally disassembled (or not disassembled at all). This for instance may be achieved by engaging the first module 210 with the second module 220 in a (semi-)permanent fashion, but wherein the first module 210 may be displaced relative to the second module 220, e.g. longitudinally displaced, in order to disrupt the apertures 230 formed in between neighboring first protrusions 212 and second protrusions 222 to facilitate the cleaning of the modular filter 200.

Figure 15:
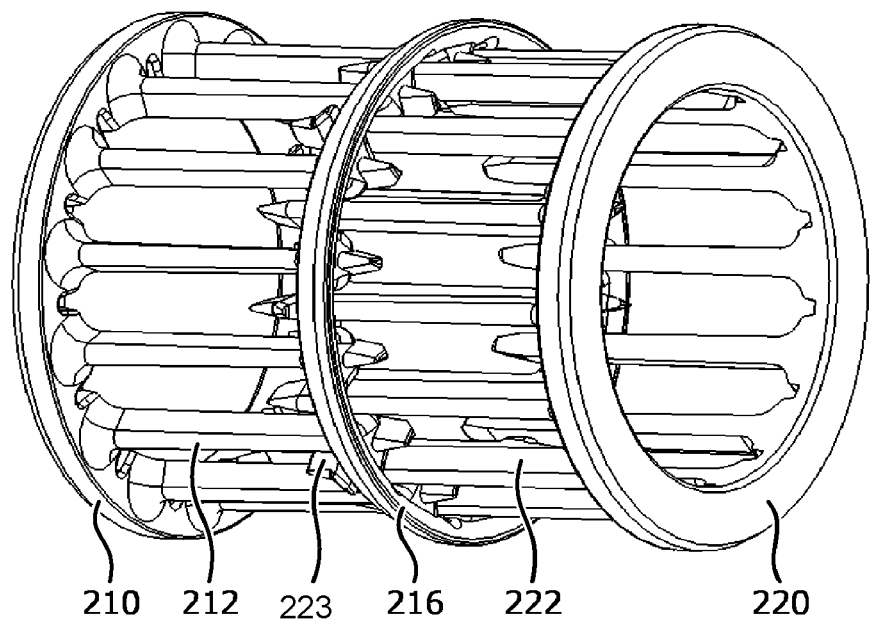
FIG. 15 schematically depicts a telescopic filter for a horizontal juice extractor according to another embodiment.
Figure 16:
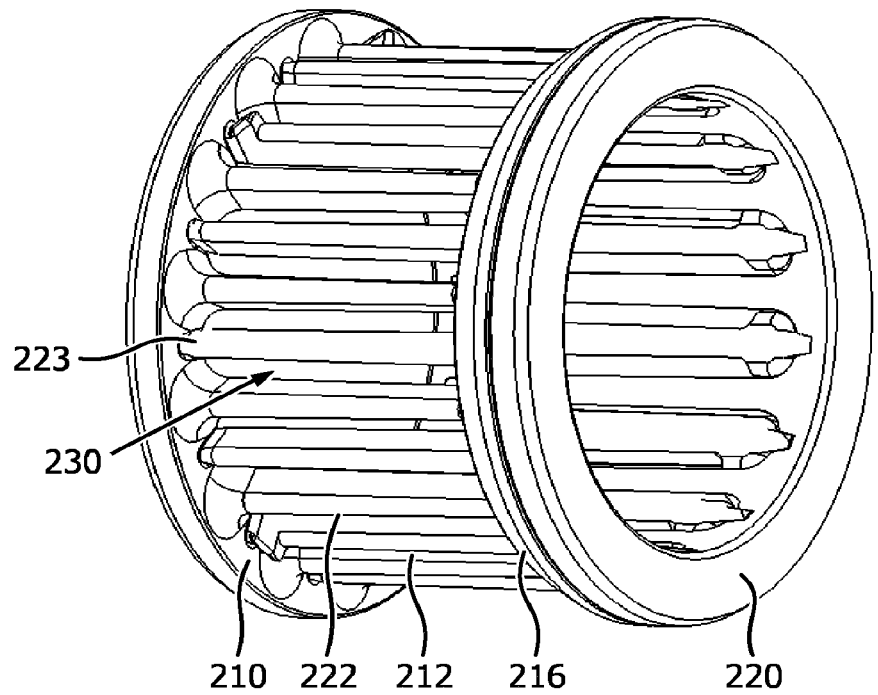
FIG. 16 schematically depicts the telescopic filter of FIG. 15 in an engaged state.

An example of such a telescopic modular filter 200 is schematically depicted in FIGS. 15 and 16. FIG. 15 schematically depicts the telescopic modular filter 200 in an extended state whereas FIG. 16 schematically depicts the telescopic modular filter 200 in an engaged state in which the apertures 230 are delimited by a first protrusion 212 and a second protrusion 222 as previously explained. In order to prevent the accidental disassembling of the telescopic modular filter 200, the end portions of the first protrusions 212 are joined by an adjoining ring 216, with the end portions 223 of the second protrusions 222 having a barb shape or the like for engaging with the adjoining ring 216. To this end, the second protrusions 222 may extend through the adjoining ring 216 with the barbed end portions 223 engaging with the adjoining ring in the extended configuration of the telescopic modular filter 200. In this embodiment, the adjoining ring 216 acts as a guide when sliding the second module 220 relative to the first module 210 (or vice versa) whilst the barbed end portions 223 prevent the second module 220 from being accidentally separated from the first module 210.

The second module 220 may be separated from the first module 210 by squeezing the second protrusions 220 inwardly in case the second protrusions 220 are made of a flexible material, e.g. a plastic material, such that the barbed end portions 223 clear the adjoining ring 216 and allow for these and portions to be pulled through the adjoining ring 216 to disassemble the telescopic modular filter 200.

In case such disassembly should be avoided altogether, the end portions 223 of the second protrusions 222 may also be joined together by a further adjoining ring (not shown), which further adjoining ring for instance may slide over the first protrusions 212 during adjustments of the telescopic modular filter 200. The adjoining ring 216 and the further adjoining ring typically abut in the extended configuration of the telescopic modular filter 200, thereby preventing the disassembly of the filter.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A horizontal juice extractor comprising:
   a main body delimiting a food processing chamber comprising:
      a juice outlet;
      a food entry section having a food inlet; and
      a food compression section extending from the food entry section, said food compression section comprising:
         a food pulp outlet wherein an inner dimension of the food compression section decreases in a direction from the food entry section towards the food pulp outlet;
         a pulp restriction element comprising a plurality of apertures;
      a spindle extending through the food processing chamber and terminating at the pulp restriction element, said spindle comprising:
         a body; and
         a helical member extending from said body, said spindle configured to transport food from the food entry section through the food compression section, wherein said plurality of apertures causing food pulp transported by the spindle to be expelled into the food pulp outlet; and
      a plurality of juice channels delimited by the spindle and extending from the pulp restriction element to the juice outlet, and
   a drivetrain configured to:
      rotate the spindle, wherein the food compression section is located between the food entry section and said drivetrain, and said juice outlet is closer to a distal end of said main body relative to the drivetrain than said food inlet, wherein said juice outlet is vertically displaced relative to the food inlet.

2. The horizontal juice extractor of claim 1, wherein the spindle is coupled to the drivetrain by a drive shaft engaging with said body, the drive shaft extending through a region of the food compression section proximal to the drivetrain, wherein the food pulp outlet is in a lower portion of the region.

3. The horizontal juice extractor of claim 2, wherein the food pulp outlet extends over a full width (W) of the region.

4. The horizontal juice extractor of claim 2, wherein said region of said food compression section proximal to said drivetrain has an upper portion delimited by curved corners.

5. The horizontal juice extractor of claim 1, wherein the spindle has a decreasing outer diameter in the direction from the food entry section towards the food pulp outlet.

6. The horizontal juice extractor of claim 1, wherein at least one of: a pitch (P) and a height (H) of the helical member decreases in the direction from the food entry section towards the food pulp outlet at least inside the food compression section.

7. The horizontal juice extractor of claim 1, further comprising a filter configure to filter an extracted juice.

8. The horizontal juice extractor of claim 7, wherein the filter is a telescopic filter including a first module, having a plurality of first protrusions, engaged with a second module, having a plurality of second protrusions, wherein the telescopic filter is configured to:
   axially extended from an engaged position in which the first protrusions and the second protrusions cooperate to define a plurality of apertures to an extended position for cleaning the first module and the second module.

9. The horizontal juice extractor of claim 7, wherein the filter is a modular filter comprising:
   a first module;
   a second module, and
   a plurality of apertures, each delimited by the first module and the second module.

10. The horizontal juice extractor of claim 9, wherein:
    the first module comprises a first body from which a plurality of first protrusions extend; and
    the second module comprises a second body from which a plurality of second protrusions extend, wherein the first protrusions and the second protrusions are shaped to cooperate such that said apertures are at least partially delimited by said first protrusions and said second protrusions.

11. The horizontal juice extractor of claim 10, wherein the filter has one is one of: a planar shape and an arcuate shape.

12. The horizontal juice extractor of claim 10, wherein the food inlet is closer to the food compression section than the juice outlet, and the filter has an annular shape for surrounding a part of said spindle above the juice outlet.

13. The horizontal juice extractor of claim 9, wherein a positioning of the first module relative to the second module is adjustable, said adjustment adjusting the size of the apertures.

14. A horizontal juice extractor comprising:
    a body comprising:
       a proximal open end; and
       a distal closed end;
       a food inlet near to the distal closed end;
       a juice outlet, opposite said food inlet, near to the distal closed end, wherein said juice outlet being closer to said distal closed end than said food inlet;
       a pulp outlet near to the proximal open end;
       a pulp restriction element comprising a plurality of apertures, and
       a juice channel extending from said pulp outlet toward said juice outlet, wherein an inner dimension of the body decreases in a direction from the food entry section towards the pulp outlet;
    a helical screw spindle contained within said body, said spindle extending from said proximal open end toward said pulp restriction element, said spindle being shaped to drive a food product inserted into said food inlet toward said pulp outlet, wherein at least one of: a pitch (P) and a height (H) of the helical screw spindle decreases in the direction from the food inlet towards the pulp outlet; and a drivetrain connected to the proximal open end, said drivetrain configured to rotate the helical screw spindle within said body.

15. The horizontal juice extractor of claim 14, wherein said body is one of: cylindrically shaped and frustoconically shaped.

16. The horizontal juice extractor of claim 14, wherein a pitch of said helical screw spindle is one of: constant and variable.

17. The horizontal juice extractor of claim 14, wherein a gap between the body and edges of the helical screw spindle is one of: constant and progressively reduced.

18. The horizonal juice extractor of claim 14, further comprising:
a filter comprising a plurality of apertures, said filter positioned between said helical screw spindle and said body.

* * * * *